United States Patent [19]

de la Poype

[11] Patent Number: 4,603,536

[45] Date of Patent: Aug. 5, 1986

[54] APPARATUS FOR FORMING A WEB OF FILM INTO A TUBULAR SHAPE IN A FORM, FILL AND SEAL PACKAGING MACHINE

[75] Inventor: Roland de la Poype, Paris, France

[73] Assignees: Societe D'Etude et D'Application Industrielle de Brevets, Villejuif, France; Baxter Travenol Laboratories, Inc., Deerfield, Ill.

[21] Appl. No.: 697,532

[22] Filed: Feb. 1, 1985

[51] Int. Cl.$^4$ .................. B65B 9/08; B65B 61/18
[52] U.S. Cl. ........................... 53/410; 53/451; 53/552; 493/213; 493/248
[58] Field of Search .............. 493/302, 438, 213, 248, 493/923, 929; 53/410, 451, 450, 550, 551, 552

[56] References Cited

U.S. PATENT DOCUMENTS

| 2,758,523 | 8/1956 | Moncrieff | 493/302 X |
| 2,912,043 | 11/1959 | Bargholtz et al. | 493/302 X |
| 3,069,303 | 12/1962 | Scholle | 493/213 X |
| 3,246,444 | 4/1966 | Paisley | 53/450 X |
| 3,320,720 | 5/1967 | Murray | 53/551 |
| 3,537,225 | 11/1970 | Fields | 53/410 |
| 3,868,891 | 3/1975 | Parish | 493/213 X |

Primary Examiner—James F. Coan
Attorney, Agent, or Firm—John P. Kirby, Jr.; Paul C. Flattery

[57] ABSTRACT

An apparatus for shaping a web of film with attached fitments into a tubular shape. The apparatus including a plate member including a cut-out portion and an oblong member. The plate member and oblong member defining a channel and cooperating to fold a web of film with attached fitments into a substantially tubular shape.

12 Claims, 3 Drawing Figures

U.S. Patent  Aug. 5, 1986  4,603,536
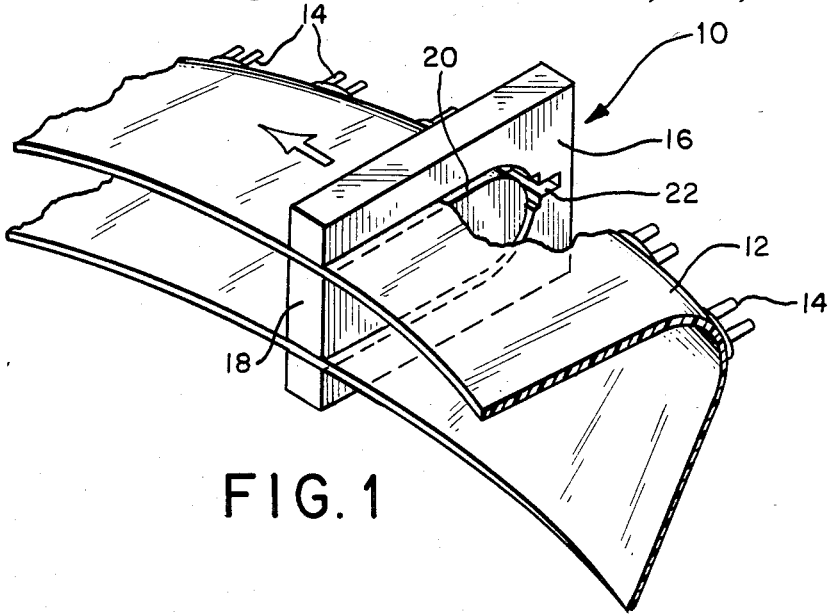
FIG. 1
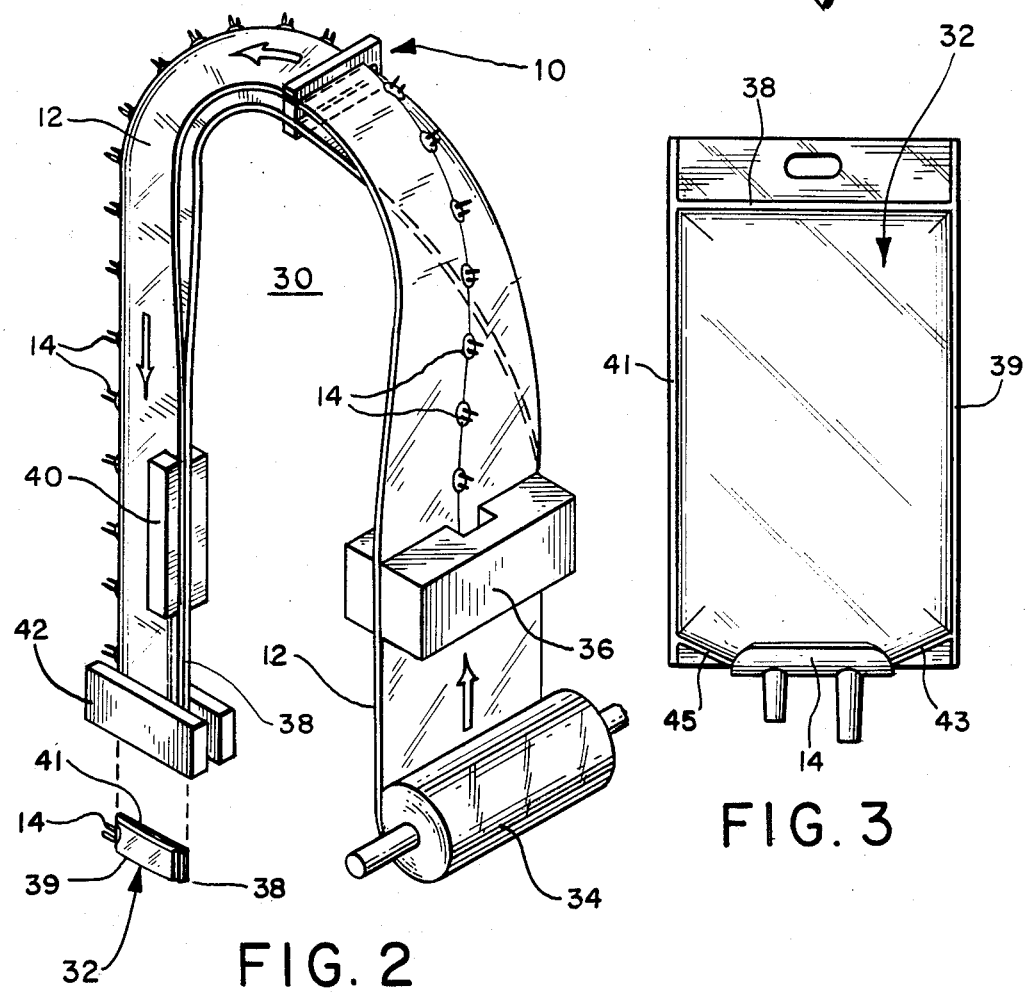
FIG. 2
FIG. 3

APPARATUS FOR FORMING A WEB OF FILM INTO A TUBULAR SHAPE IN A FORM, FILL AND SEAL PACKAGING MACHINE

BACKGROUND OF THE INVENTION

This invention relates generally to apparatus for forming a web of film into a tubular shape in a form, fill and seal packaging machine and to form, fill and seal packaging machines. Specifically, this invention relates to an apparatus for forming a web of film with attached fitments into a tubular shape and to a novel form, fill and seal packaging machine.

Form, fill and seal packaging machines are known in the art to form from a web of film a container for housing a product. Flexible containers are known in the art and are utilized to house dairy products, food stuffs, wine, pharmaceutical products, and other products. In the pharmaceutical area, among others, it is desirable that the flexible containers include fitments or other means for accessing the fluid contained within the container.

Apparatus for creating flexible containers with fitments are known in the art. These apparatus typically form a web of film into a tubular shape utilizing a former and then attach the fitment to the web of film. Because the fitment is attached to the web of film after the film is folded into a tubular shape, and not while the film is flat, a slower more difficult process is created.

The purpose of the present invention is to overcome the disadvantages of the prior art.

SUMMARY OF THE INVENTION

The present invention discloses a former for shaping a web of film with attached fitments into a tubular shape so that it may be sealed, filled, and sealed in a form, fill, and seal packaging machine. The former of the present invention comprises a plate including a cut-out and an oblong member. Preferably, the cut-out has a profile that is substantially similar to the cross-sectional profile of the fitment that is attached to the flexible web of film. The plate and oblong member cooperate to allow the flexible web of film with attached fitments to be shaped into a tubular shape so that it may be created into a flexible container.

The present invention also discloses a process of creating from a roll of flexible film a flexible container for housing solutions to be maintained under sterile conditions. The process comprises: unrolling a flexible sheet of material; sealing fitments onto a flat portion of the web of film; securing the fitments along a central longitudinal weld line; folding the web of film along the longitudinal weld line which becomes the fold line; after the web of film is folded along the longitudinal weld line, opposite ends of the sheet are then welded together; the side walls of the container are then created by transverse welds; oblique welds, chevrons, are created at the same time along the longitudinal weld line; and the sheet of flexible material is separated into individual flexible bags by cutting the sheet of material between the transverse welds.

Preferably, the apparatus of this invention can create a flexible container that includes at least one weld, a chevron, extending in an oblique direction from the fitment to one sidewall of the bag.

Accordingly, it is an advantage of the present invention to provide a former that allows fitments to be attached to a web of film in a form, fill and seal packaging machine before the web of film is shaped into a tubular shape.

Another advantage of the present invention is that it provides an improved process for forming, filling and sealing a web of film to create a flexible container.

An additional advantage of the present invention is that it creates an improved flexible container having chevrons.

A further advantage of the present invention is that it provides a flexible container with improved delivery characteristics.

Moreover, an advantage of the present invention is that it provides an improved former for a form, fill, and seal packaging machine.

Additional features and advantages are described in, and will be apparent from, the Detailed Description of the Presently Preferred Embodiments and from the Drawings.

BRIEF DESCRIPTION OF THE DRAWINGS

FIG. 1 illustrates a plan view of the former of the present invention.

FIG. 2 illustrates a plan view of the apparatus for creating flexible containers of this invention.

FIG. 3 illustrates a plan view of a flexible container made utilizing the apparatus of the present invention.

DETAILED DESCRIPTION OF THE PRESENTLY PREFERRED EMBODIMENTS

FIG. 1 illustrates the former 10 of the present invention. The former 10 is constructed so that a web of flexible film 12 with attached fitments 14 may be formed into a tubular shape in a form, fill and seal packaging machine. As will be described in more detail below, once the web of film 12 is formed into a tubular shape, it is then sealed, filled, and sealed to create a flexible container.

The former 10 includes a plate 16 and an oblong member 18. The plate 16 and oblong member 18 define a channel 20. Preferably, the channel 20 has a semi-oval cross-sectional shape. It is through the semi-oval channel 20 that the web of film 12, with attached fitments 14, passes so that it is shaped into a tubular shape.

The plate 16 includes a cut-out 22 that allows the fitments 14 attached to the web of film 12 to pass therethrough. Preferably, the cut-out 22 has a profile that is substantially similar to the cross-sectional profile of the fitments 14 that are to pass therethrough.

As illustrated, preferably, the cut-out 22 is located substantially in the center of the plate member 16. This construction allows the flexible film 12 with attached fitments 14 to be shaped into a tubular shape by being folded down the lateral center of the flexible film, to create a flexible container with a fitment extending from the bottom of the container. Of course, if the fitments are to be located on the side of the flexible container, the cut-out 22 will accordingly be oriented on one side of the plate 16.

The cut-out member 22 not only functions to allow the fitments 14 to pass through the former 10, but also functions to guide the web of film 12 through the former 10 as well as to ensure that the film and fitments 14 are properly oriented as they pass through the form, fill and seal packaging machine. This helps ensure that when the transverse and end seals are effectuated they are properly oriented.

Referring now to FIG. 2, the form, fill and seal packaging machine 30 for creating a flexible container 32 utilizing the former 10 of the present invention is illustrated. The form, fill and seal packaging machine 30 includes a roll 34 from which a web of flexible film 12 is fed. At a fitment attaching station 36 the fitments 14 are attached to the web of film 12 while it is in a flat condition. The fitment attaching station 36 may be any fitment attaching apparatus known in the art. An example of such fitment attaching station is French Pat. No. 1,291.649, the disclosure of which is incorporated herein by reference. Preferably, the fitments 14 are attached to the lateral center of the web of film 12.

After the fitments 14 have been attached to the web of film 12, the film is then formed in a tubular shape by the former 10. As previously discussed, the former 10 allows the web of film 12 to be formed into a tubular shape even though the film has fitments 14 attached thereto. Although only one former 10 is illustrated, additional formers 10 may be located along the path of the web of film to ensure that the web of film 12 is properly oriented on the form, fill and seal packaging machine 30.

After the film 10 has been formed into a tubular shape, the end seals 38 may be effectuated by an end sealer 40. The end sealer 40 may be any end sealer known in the art that will seal the web of film 12 onto itself by heat, RF welding, or the like.

Transverse seals 39 and 41 are created at the transverse sealing station 42. The transverse sealing station 42 may be any sealing station known in the art for creating transverse seals on a web of film 12. The form, fill and seal packaging machine 30 also includes a fill tube (not shown) that fills the web of film 12 after one of the transverse seals has been created so that a flexible container 32 containing a solid or liquid is created. The transverse sealing station 42 also includes means for severing the web of film between two transverse seals so that individual flexible containers 32 may be created.

In a preferred embodiment, the transverse sealing station 42 may effect oblique welds 43 and 45, or chevrons, that extend from the fitment 14 to the transverse welds 39 and 41. As illustrated in FIG. 3, the oblique weld lines 43 and 45, or chevrons, provide a flexible container 32 that has better delivery characteristics. To this end, the chevrons or oblique welds 41 and 45 direct the contents of the container 32 to the fitment 14.

FIG. 3 illustrates a flexible container 32 created by the form, fill and seal packaging machine 30 of the present invention. It should be noted that a flexible container 32 with only one oblique weld line and with the fitment 14 located at one end of the flexible container will also provide a container with good delivery characteristics.

It is to be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. An apparatus for shaping a web of film with attached fitments into a tubular shape comprising:
    a plate member including a cut-out portion;
    an oblong member;
    a channel defined by the oblong member and plate member; and
    the oblong member and the plate member cooperating to fold a web of film with attached fitments down a lateral center of the web of film into a substantially tubular shape.

2. The apparatus of claim 1 wherein the cut-out member has a cross-sectional profile that is substantially similar to the cross-sectional shape of the fitments attached to the web of film.

3. The apparatus of claim 1 wherein the channel has a semi-oval cross-sectional shape.

4. The apparatus of claim 1 wherein the plate member has a substantially rectangular shape.

5. A former for shaping a web of film with attached fitments into a tubular shape comprising:
    means for defining a channel for forming a web of film into a tubular shape; and
    the means for defining the channel including means for allowing the fitments attached to the web of film to pass therethrough.

6. The apparatus of claim 5 wherein the means for allowing the fitments attached to the web of film to pass therethrough is a cut-out having a profile substantially similar to the cross-sectional profile of the fitments.

7. The apparatus of claim 5 wherein the means for defining the channel includes:
    an oblong member; and
    a plate member.

8. The apparatus of claim 5 wherein the channel has a semi-oval cross-sectional shape.

9. A form, fill and seal packaging machine for creating flexible containers from a web of flexible film comprising:
    means for feeding from a roll of flexible film the web of flexible film;
    fitment attaching means for attaching to a substantially flat portion of the web of flexible film at least one fitment;
    a former for forming the web of flexible film with attached fitments into a tubular shape, the former including a channel for receiving the web of flexible film, the channel having a cut-out portion for allowing the fitment to pass therethrough;
    means for creating an end seal between ends of the web of flexible film;
    means for creating transverse seals between the web of flexible film;
    means for filling the web of flexible film with a product to be housed; and
    means for severing the web of flexible film to create individual flexible containers.

10. The packaging machine of claim 9 including means for creating at least one oblique weld between a fitment and a transverse seal.

11. A process for creating a flexible container comprising the steps of:
    feeding a web of film into a form, fill and seal packaging machine;
    attaching fitments to the web of film while the film in a substantially flat condition;
    passing the web of film with attached fitments through a channel with a cut out;
    sealing an end of the web of film;
    sealing a side of the web of film;
    filling the web of film with a product;
    sealing a second side of the web of film;
    creating an oblique weld between a fitment and a side weld; and
    severing the web of film into an individual package.

12. A flexible container made by the process of claim 11.

* * * * *